US012682204B2

(12) United States Patent
Takada

(10) Patent No.: US 12,682,204 B2
(45) Date of Patent: Jul. 14, 2026

(54) COMPRESSING OLD MACHINE LEARNING DATASET DATA FOR USE BY A HUMAN

(71) Applicant: Hitachi, Ltd., Tokyo (JP)

(72) Inventor: Masanori Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 742 days.

(21) Appl. No.: 18/044,514

(22) PCT Filed: Feb. 5, 2021

(86) PCT No.: PCT/JP2021/004313
§ 371 (c)(1),
(2) Date: Mar. 8, 2023

(87) PCT Pub. No.: WO2022/168263
PCT Pub. Date: Aug. 11, 2022

(65) Prior Publication Data
US 2023/0334282 A1 Oct. 19, 2023

(51) Int. Cl.
*G06N 3/02* (2006.01)
(52) U.S. Cl.
CPC ...................................... *G06N 3/02* (2013.01)
(58) Field of Classification Search
CPC ....................................................... G06N 3/02
See application file for complete search history.

(56) References Cited

U.S. PATENT DOCUMENTS 10,715,176 B1 * 7/2020 Singh .................. H03M 7/3059
2018/0174047 A1 6/2018 Bourdev et al.

OTHER PUBLICATIONS

Dejean-Servières, Mathieu, et al. Study of the impact of standard image compression techniques on performance of image classification with a convolutional neural network. Diss. INSA Rennes; Univ Rennes; IETR; Institut Pascal, 2017. (Year: 2017).*
Zhang, Zhao, et al. "Efficient I/O for neural network training with compressed data." 2020 IEEE International Parallel and Distributed Processing Symposium (IPDPS). IEEE, 2020. (Year: 2020).*
Castelli, Vittorio, et al. "Progressive search and retrieval in large image archives." IBM Journal of Research and Development 42.2 (1998): 253-268. (Year: 1998).*
Kuchnik, Michael, George Amvrosiadis, and Virginia Smith. "Progressive compressed records: Taking a byte out of deep learning data." arXiv preprint arXiv:1911.00472 (2019). (Year: 2019).*
Calhoun, S. Patrick, et al. "Large scale research data archiving: Training for an inconvenient technology." Journal of Computational Science 36 (2019): 100523. (Year: 2019).*

(Continued)

*Primary Examiner* — Hal Schnee
(74) *Attorney, Agent, or Firm* — Volpe Koenig

(57) ABSTRACT
A data management system including a processor connected to a storage device that stores data usable for learning and inference in a machine learning model, the data management system including a compressor/decompressor for human that compresses and decompresses data to be usable for verification performed by human, in which the processor specifies data that is no longer used for learning and inference in the machine learning model among the data stored in the storage device, and compresses the specified data using the compressor/decompressor for human.

20 Claims, 10 Drawing Sheets

(56) References Cited

OTHER PUBLICATIONS

Johnston, Nick, et al. "Computationally efficient neural image compression." arXiv preprint arXiv:1912.08771 (2019). (Year: 2019).*
International Search Report, PCT/JP2021/004313, Apr. 27, 2021, 2 pgs.

* cited by examiner

[FIG. 1]
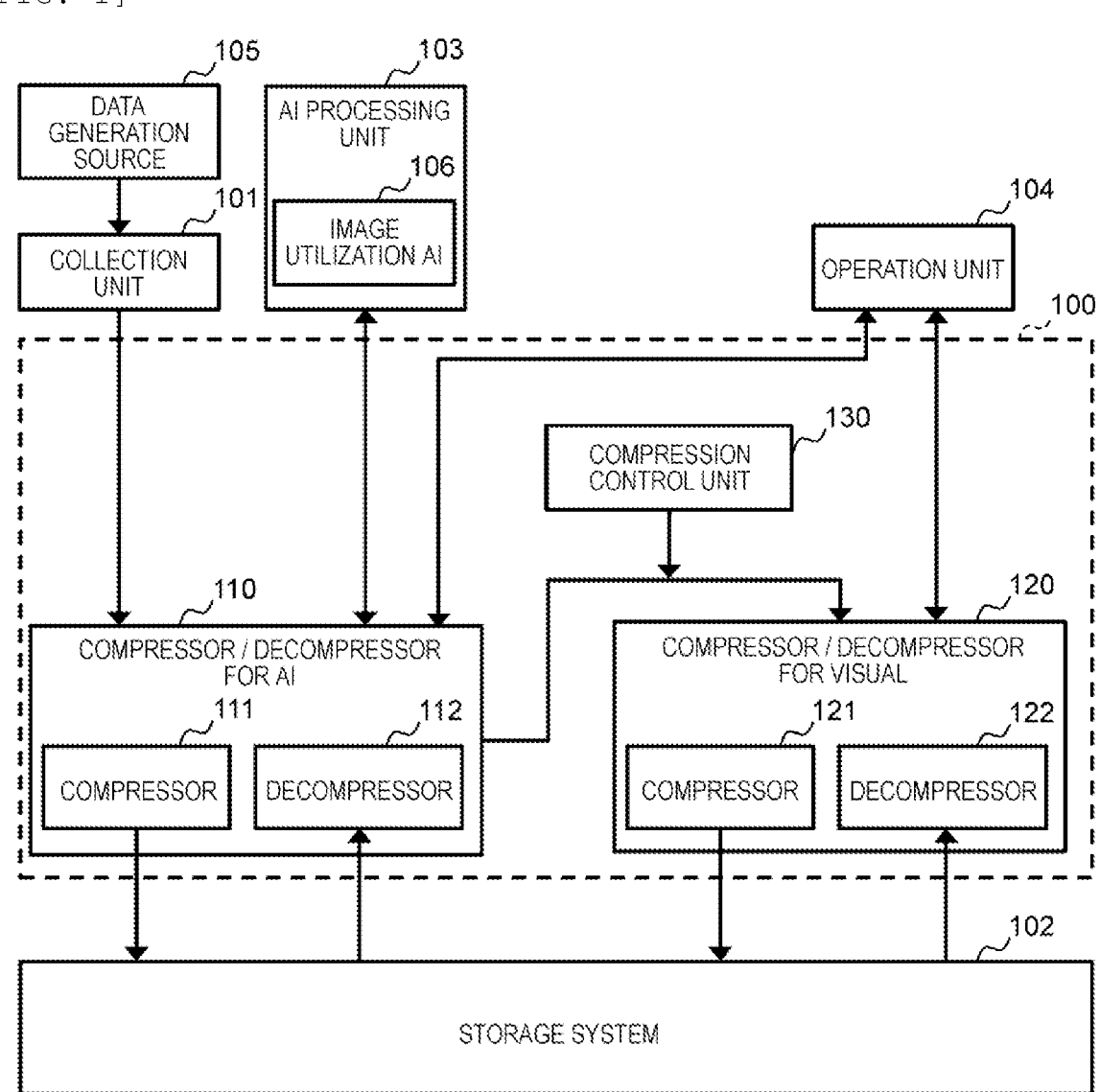

[FIG. 2]
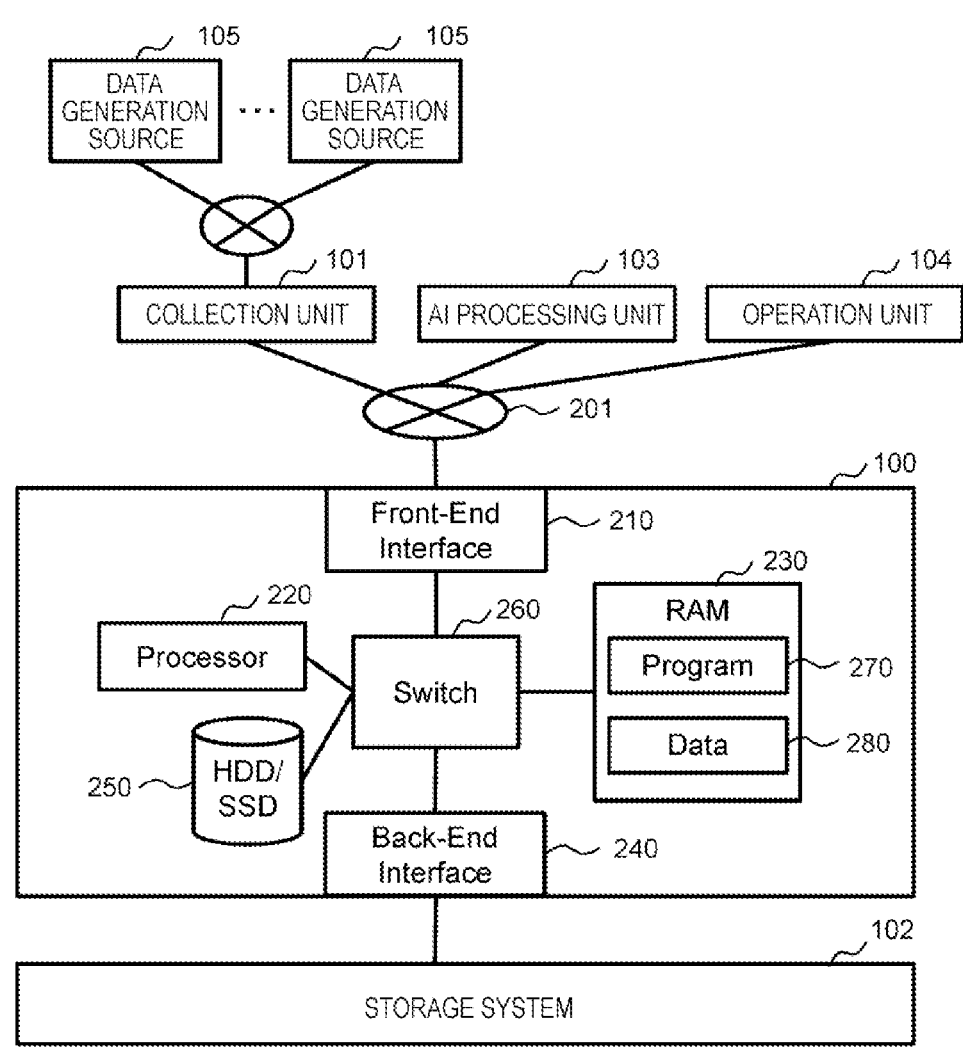

[FIG. 3]
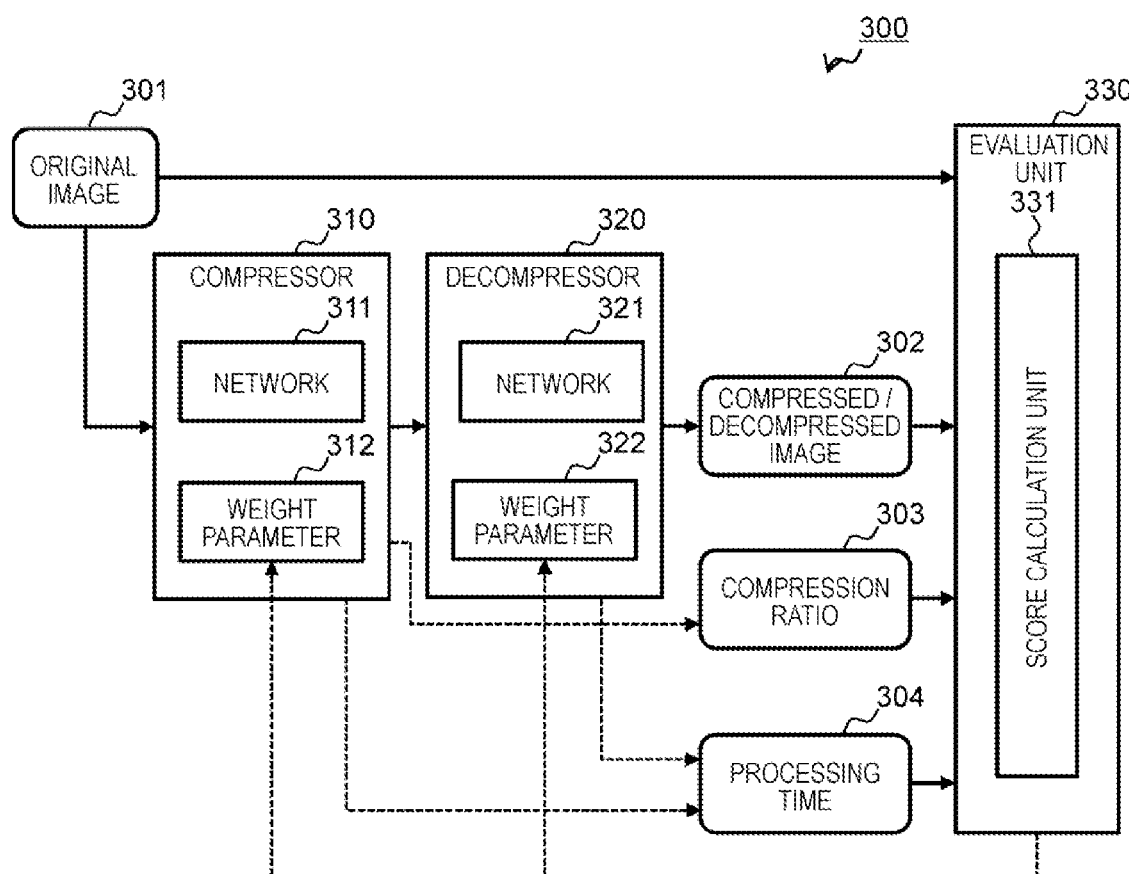

[FIG. 4]
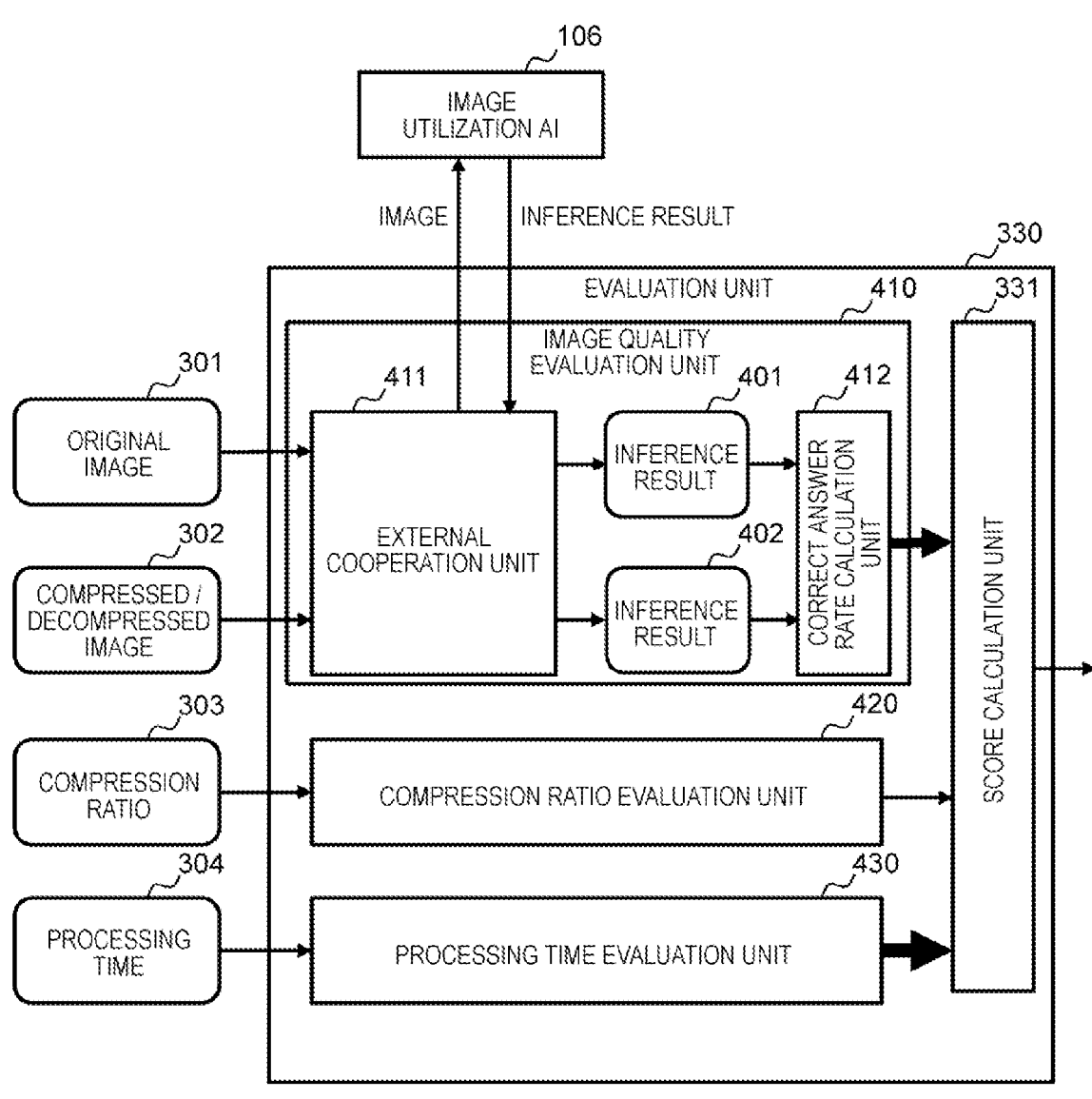

[FIG. 5]
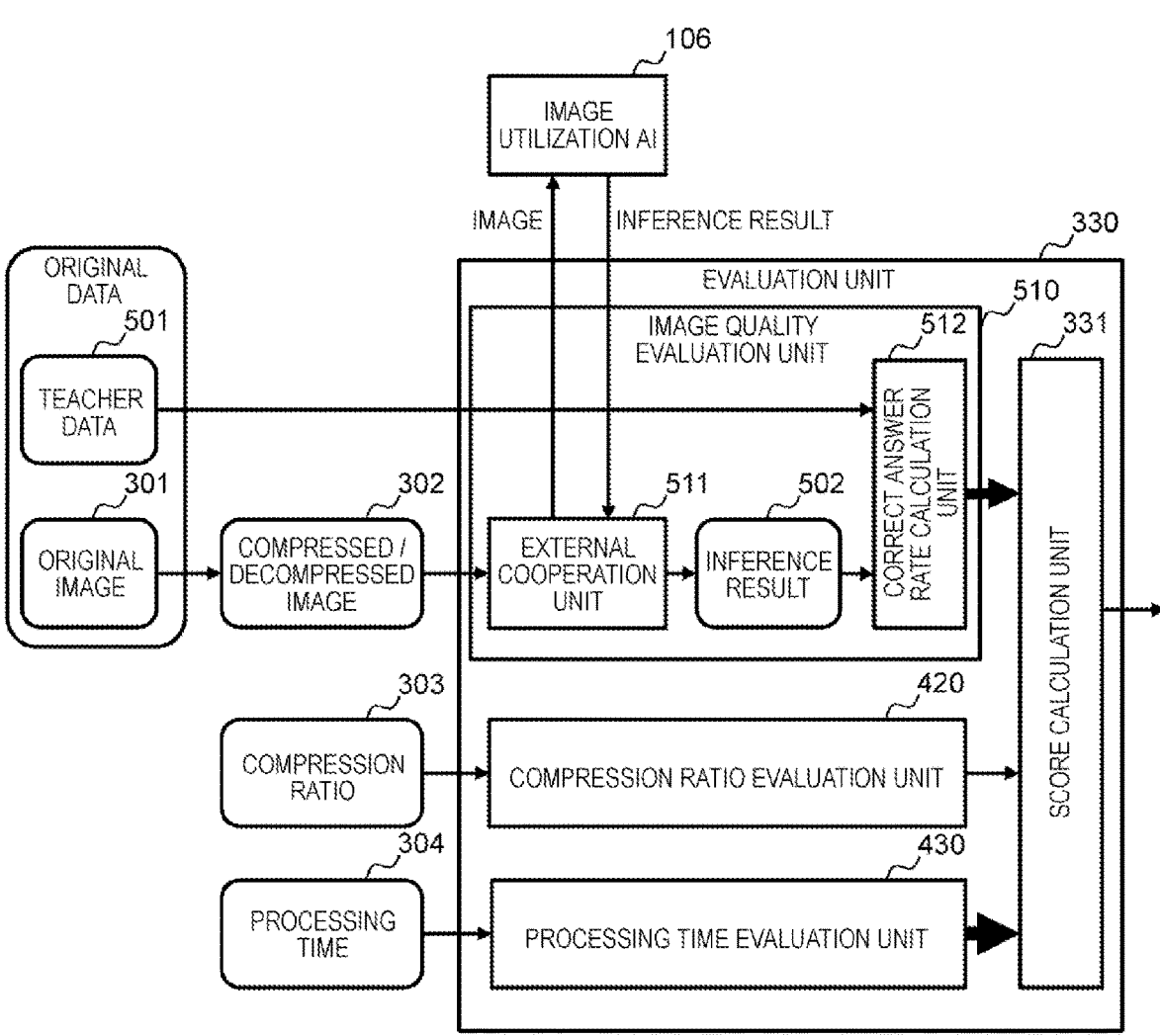

[FIG. 6]
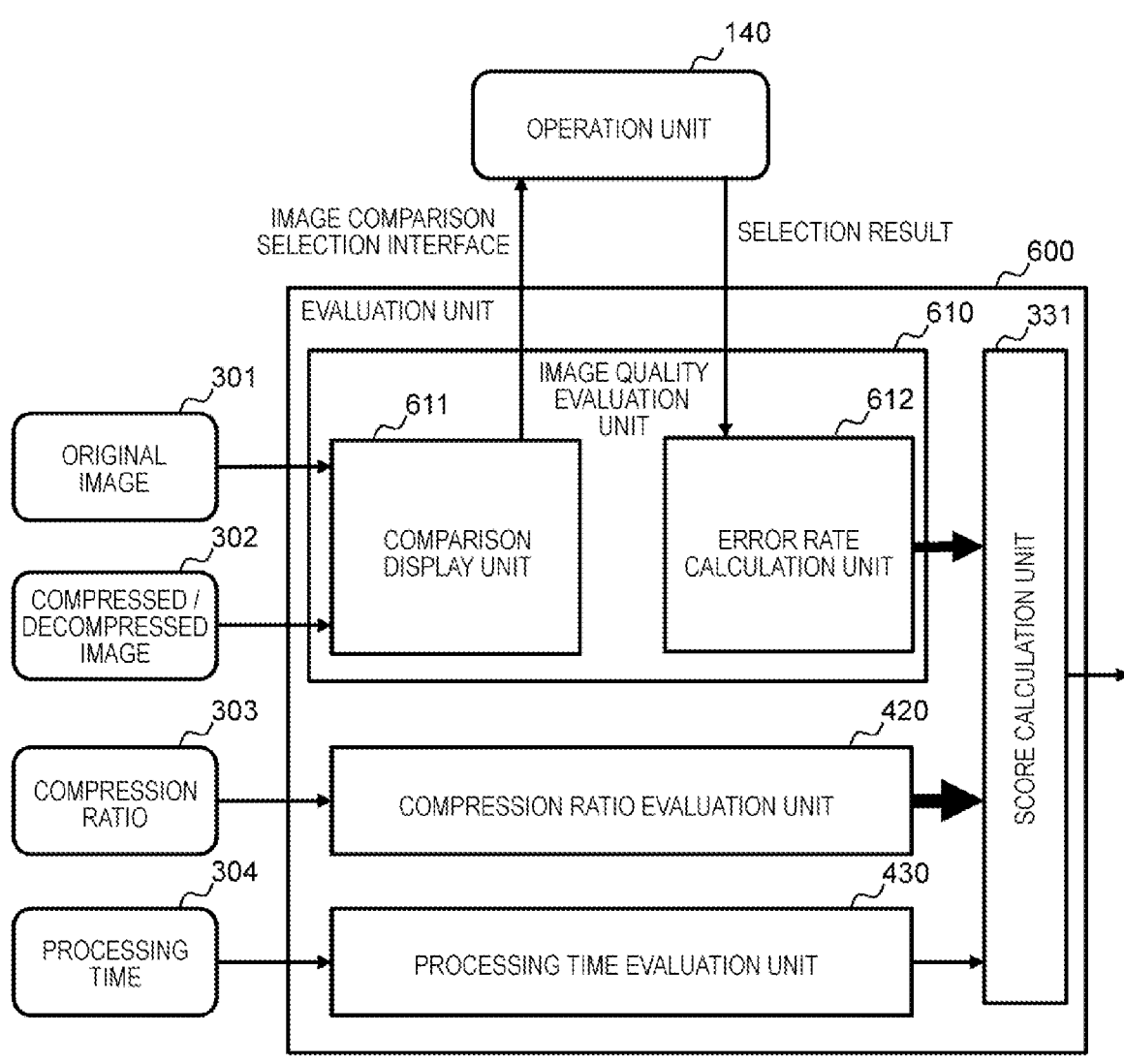

[FIG. 7]
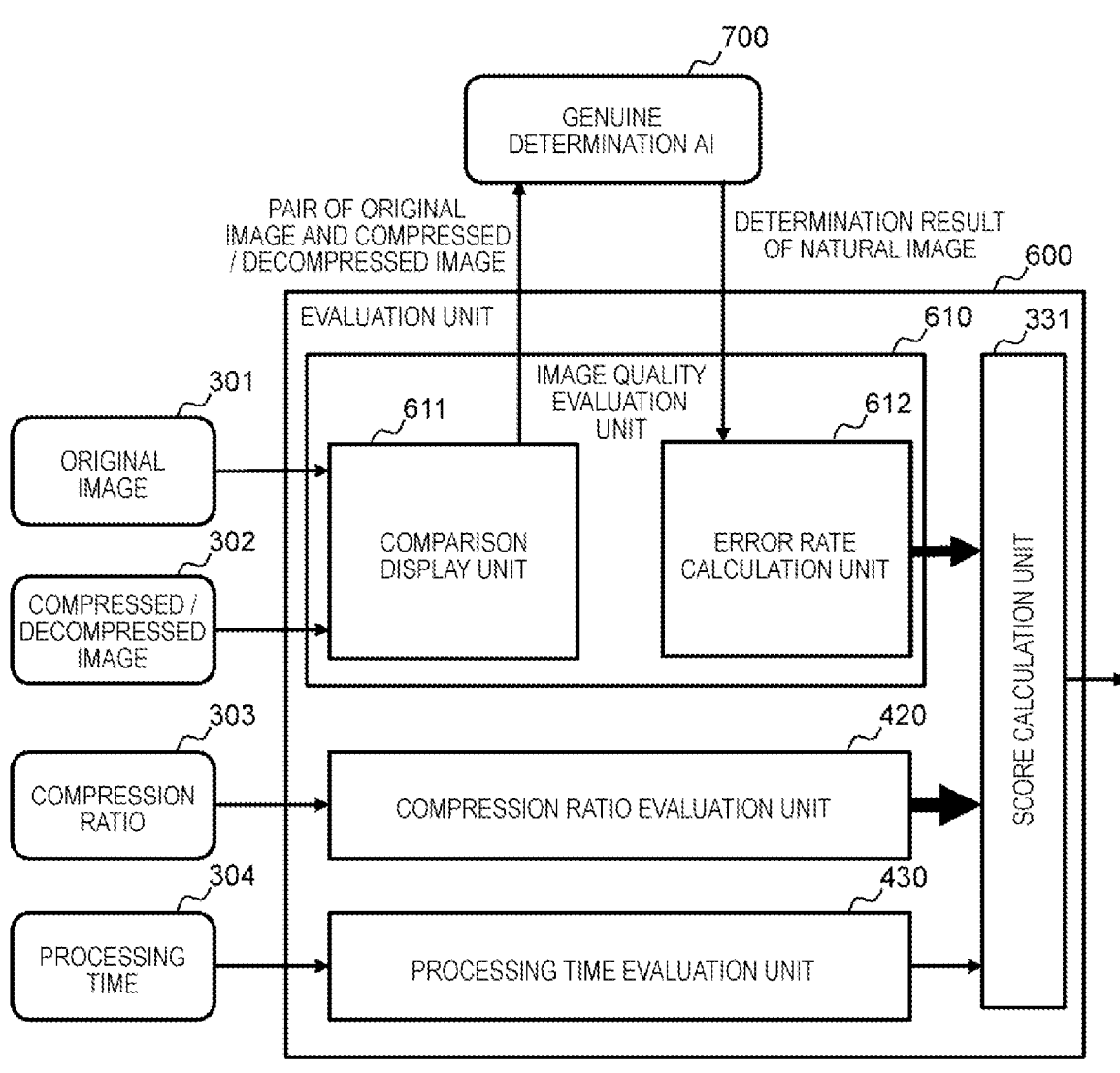

| ID | STATUS | GENERATION DATE | LAST REFERENCE DATE | STORAGE LOCATION |
|---|---|---|---|---|
| Img01 | COMPRESSION FOR VISUAL | 2020/XX/XX | 2020/03 | hrimg/01 |
| Img02 | COMPRESSION FOR VISUAL | 2021/XX/XX | 2021/04 | hrimg/02 |
| Img03 | COMPRESSION FOR VISUAL | 2022/XX/XX | 2022/05 | hrimg/03 |
| Img04 | COMPRESSION FOR AI | 2023/01 | 2023/05 | aiimg/04 |
| Img05 | COMPRESSION FOR AI | 2023/02 | 2023/05 | aiimg/05 |

| ITEM | VALUE |
|------|-------|
| 901 | 902 |
| NUMBER OF USED SHEETS | 100,000 SHEETS |
| STORAGE PERIOD | 10 YEARS |
| SPECIFIED PERIOD | 2 MONTHS |

[FIG. 10]
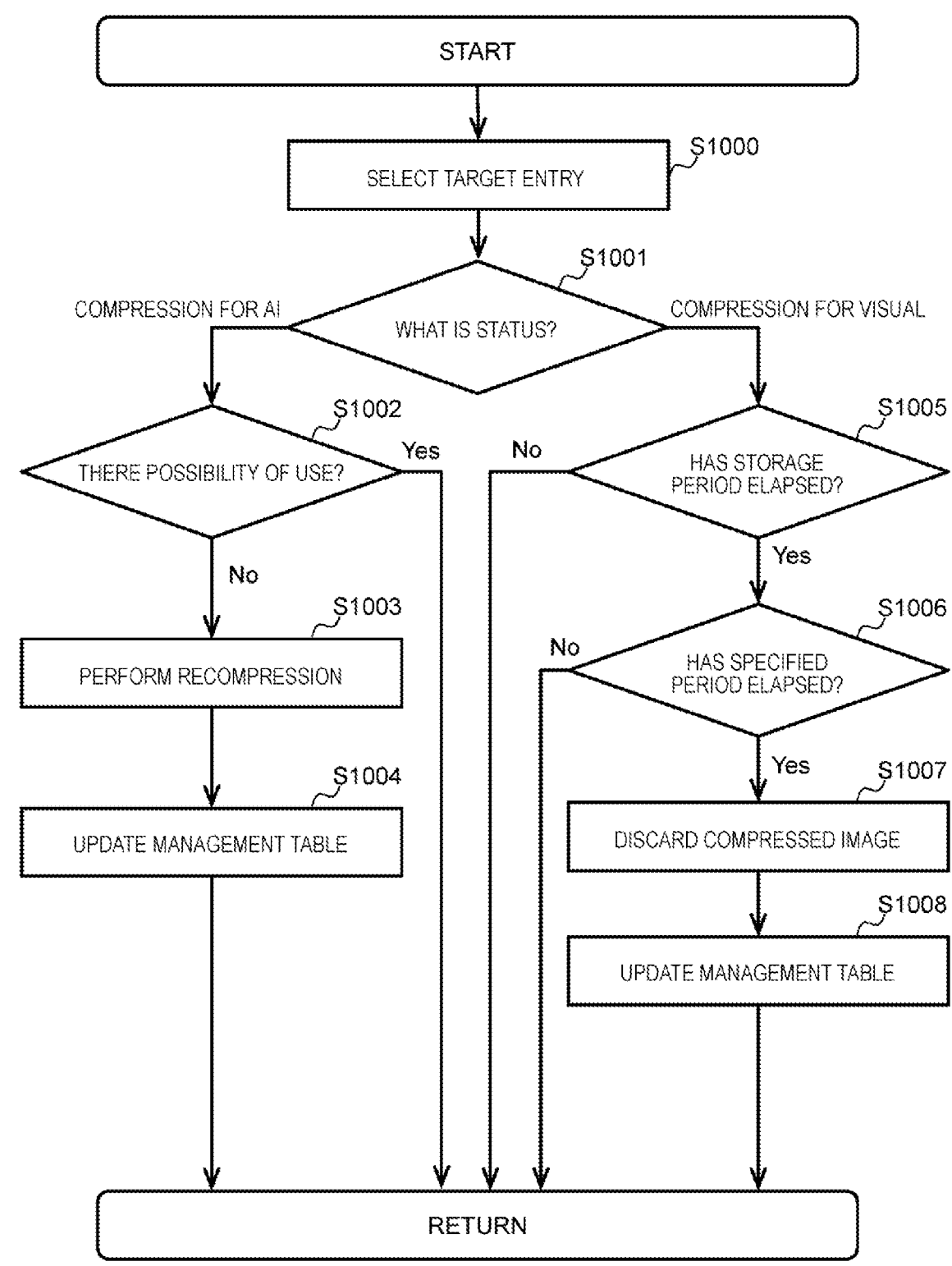

COMPRESSING OLD MACHINE LEARNING DATASET DATA FOR USE BY A HUMAN

TECHNICAL FIELD

The present invention relates generally to data compression.

BACKGROUND ART

In facilities such as factories, neural networks (hereinafter referred to as "artificial intelligence (AI)") have begun to be used for detection of defective products, detection of deviant motions in work, and the like. A facility is provided with a sensor, and in the AI, data acquired by the sensor is used for AI learning and inference.

In recent years, the amount of data acquired by sensors has increased, and storage capacity required to store the data has increased.

Accordingly, a technology for giving compressed data to a machine learning task and feeding back the accuracy of inference to a compressor has been disclosed (see US2018/0174047A (PTL 1)). According to such a technique, it is possible to reduce the amount of data by compressing data used for AI learning and inference.

CITATION LIST

Patent Literature

PTL 1: US2018/0174047A

SUMMARY OF INVENTION

Technical Problem

In many cases, the most recent fixed amount of data used for AI learning is sufficient, but human may desire to refer to data again to perform verification such as analysis of a problem that occurred after a long period of time passed since a product has been shipped, and investigation of the cause of the problem. However, in this case, in the technique disclosed in PTL 1, data used for AI learning is continuously stored as it is, and storage capacity required to store data for verification is increased.

The invention has been made considering the above-described points and is intended to propose a data management system and the like which are capable of reducing the amount of data according to the application of the data.

Solution to Problem

In order to solve such a problem, the invention provides a data management system including a processor connected to a storage device that stores data usable for learning and inference in a machine learning model, the data management system including a compressor/decompressor for human that compresses and decompresses data to be usable for verification performed by human, in which the processor specifies data that is no longer used for learning and inference in the machine learning model among the data stored in the storage device, and compresses the specified data using the compressor/decompressor for human.

In the above configuration, the data that is no longer used for learning and inference in the machine learning model is compressed to be usable for verification performed by human, and thus it is possible to reduce storage capacity required for storage of data for verification. According to the above configuration, the amount of data can be reduced according to the application of the data.

Advantageous Effects of Invention

According to the invention, the amount of data can be reduced according to the application of the data.

BRIEF DESCRIPTION OF DRAWINGS

FIG. 1 is a diagram illustrating an example of a configuration related to functions of a data management system according to a first embodiment.

FIG. 2 is a diagram illustrating an example of a configuration related to hardware of the data management system.

FIG. 3 is a diagram illustrating a learning method for a compressor/decompressor for AI according to the first embodiment.

FIG. 4 is a diagram illustrating an example of a configuration related to an evaluation unit according to the first embodiment.

FIG. 5 is a diagram illustrating an example of a configuration related to the evaluation unit.

FIG. 6 is a diagram illustrating an example of a configuration related to the evaluation unit.

FIG. 7 is a diagram illustrating an example of a configuration related to the evaluation unit.

FIG. 8 is a diagram illustrating an example of management information according to the first embodiment.

FIG. 9 is a diagram illustrating an example of the management information.

FIG. 10 is a diagram illustrating an example of compressed image management processing according to the first embodiment.

DESCRIPTION OF EMBODIMENTS

(I) First Embodiment

Hereinafter, an embodiment of the invention will be described in detail. However, the invention is not limited to the embodiment.

(Outline)

In the present embodiment, a technique for changing a compression method according to changes in the phase of a way of using data (data usage) will be described. In a data management system according to the present embodiment, data is managed to be used for learning of the latest AI (development of AI, feed-back to AI) and verification in the event of a long-term problem while enabling inference with AI.

In the present specification, "first", "second", "third", and the like are used to identify components and do not necessarily limit the number or order. Numbers for identifying components are used for each context, and numbers used in one context do not necessarily indicate the same configuration in other contexts. It does not preclude a component identified by a certain number from including the function of a component identified by another number.

Next, embodiments of the invention will be described with reference to the drawings. The following description and drawings are examples for describing the invention, and are appropriately omitted and simplified for clarity of description. The invention can also be implemented in various other forms. Unless otherwise specified, each component may be singular or plural. Note that, in the following description, the same elements in the drawings are denoted by the same reference numerals, and the description thereof is omitted as appropriate.

(Functional Configuration)

FIG. 1 is a diagram illustrating an example of a configuration related to functions of a data management system 100. A collection unit 101, a storage system 102, an AI processing unit 103, and an operation unit 104 are connected to the data management system 100.

The collection unit 101 is a device that collects (acquires) data from a data generation source 105. The data generation source 105 is one or more subjects that generate data, such as a sensor (for example, a camera or a microphone), a system log, or the like. The data generation source 105 is provided in a facility such as a factory or a building. Data generated by the data generation source 105 includes image data (image), audio data, log data, and the like, and an image will be taken as an example in the following description.

The collection unit 101 transmits images collected from the data generation source 105 to the data management system 100 at a predetermined timing. The predetermined timing may be a predesignated time, may be periodic, may be real time, or may be any of other timings.

The storage system 102 is a system that stores (accumulates) images used by the AI processing unit 103 and images used by the operation unit 104.

The AI processing unit 103 is a device that includes an image utilization AI 106, learns an image utilization AI 106 using images stored in the storage system 102 as learning data, and executes the image utilization AI 106. The image utilization AI 106 is a neural network (machine learning model) that performs detection such as detection of defective products in products (hardware products such as automobiles and elevators, software products such as applications, and the like), detection of deviant motions in work, and the like by using the images stored in the storage system 102.

The operation unit 104 is a device that includes an input/output device operated by users, such as engineers and production managers, who use images stored in the storage system 102. For example, when a problem occurred in a product after the product has been shipped, the user operates the operation unit 104 to confirm images stored in the storage system 102 and performs verification such as analysis of the problem and investigation of the cause.

The data management system 100 includes a compressor/decompressor for AI 110, a compressor/decompressor for visual 120, and a compression control unit 130. Note that, in the present embodiment, the data management system 100 which includes the compressor/decompressor for AI 110 is described, but the invention is not limited thereto. For example, the data management system 100 may not include the compressor/decompressor for AI 110. Here, an image generated by the data generation source 105 is stored in the storage system 102 without being compressed. Even when the image stored in the storage system 102 is an uncompressed image, the image can be used for learning and inference in the image utilization AI 106.

The compressor/decompressor for AI 110 includes a compressor 111 and a decompressor 112 that are constituted by a neural network. The compressor 111 and the decompressor 112 are learned using images and the like generated by the data generation source 105 as learning data. Note that a learning method will be described later with reference to FIGS. 3 to 5.

The compressor 111 compresses an image with an image quality that can withstand learning and inference in the image utilization AI 106. Hereinafter, an image compressed by the compressor 111 will be referred to as a "first compressed image". The decompressor 112 decompresses the first compressed image. Hereinafter, an image decompressed by the decompressor 112 will be referred to as a "first decompressed image".

For example, the compressor/decompressor for AI 110 receives an image generated by the data generation source 105 through the collection unit 101, compresses the image by the compressor 111, and stores the compressed image in the storage system 102.

For example, the compressor/decompressor for AI 110 decompresses, by the decompressor 112, the first compressed image acquired from the storage system 102 in response to a request received from the AI processing unit 103 or a request received from the operation unit 104 when a short-term problem occurs, and transmits the decompressed image to a request source (the AI processing unit 103 or the operation unit 104). For example, the AI processing unit 103 performs learning of the image utilization AI 106 and performs inference by the image utilization AI 106 by using the received first decompressed image. For example, when a short-term problem occurs, the operation unit 104 presents the received first decompressed image to the user so that the user performs verification.

The compressor/decompressor for visual 120 includes a compressor 121 and a decompressor 122 that are constituted by a neural network. The compressor 121 and the decompressor 122 learn an image generated by the data generation source 105, the first decompressed image, and the like as learning data. Note that a learning method will be described below with reference to FIGS. 6 and 7.

The compressor 121 compresses an image with an image quality that can withstand human viewing. Hereinafter an image compressed by the compressor 121 will be referred to as a "second compressed image". The decompressor 122 decompresses the second compressed image. Hereinafter, an image decompressed by the decompressor 122 will be referred to as a "second decompressed image". Note that, when the first compressed image and the second compressed image are not distinguished from each other, the compressed images may be referred to as a "compressed image", and when the first decompressed image and the second decompressed image are not distinguished from each other, the decompressed images may be referred to as a "decompressed image".

For example, the compressor/decompressor for visual 120 compresses the first decompressed image by the compressor 121 in response to a compression instruction received from the compression control unit 130, and stores the compressed image in the storage system 102 as a second compressed image.

For example, the compressor/decompressor for visual 120 decompresses the second compressed image acquired from the storage system 102 by the decompressor 122 in response to a request received from the operation unit 104 when a long-term problem occurs, and transmits the decompressed image to the operation unit 104. For example, the operation unit 104 presents the received second decompressed image to the user so that the user performs verification.

When the first compressed image is no longer used for learning and inference in the image utilization AI 106, the compression control unit 130 transmits a compression instruction to the compressor/decompressor for visual 120 to convert the first compressed image into a second compressed image (hereinafter referred to as "recompression"). When recompression conditions, such as accumulation of a certain amount of new first compressed images or elapse of a certain period of time since the generation of the first compressed image, are satisfied, the compression control unit 130 determines that the first compressed image is no longer used to perform learning and inference in the image utilization AI 106.

(Hardware Configuration)

A hardware configuration of the data management system 100 will be described with reference to FIG. 2. FIG. 2 is a diagram illustrating an example of a hardware configuration of the data management system 100.

The data management system 100 is a laptop computer, a server device, or the like. More specifically, the data management system 100 includes a front-end interface 210, a processor 220, a random access memory (RAM) 230, a back-end interface 240, a storage drive 250 (hard disk drive (HDD)/solid state drive (SSD)), and a switch 260.

The front-end interface 210 is an interface for connecting the data management system 100, the collection unit 101, the AI processing unit 103, the operation unit 104, and the like to each other through the switch 201. The switch 201 connects the data management system 100, the collection unit 101, the AI processing unit 103, and the operation unit 104 to each other.

The processor 220 controls the entire data management system 100 through the switch 260 based on a program 270 and management information 280 (data) stored in the RAM 230. The processor 220 may be an accelerator such as a graphical processing unit (GPU) or a field programmable gate array (FPGA), in addition to a general-purpose arithmetic processor such as a central processing unit (CPU) or may be a combination thereof. Note that the management information 280 will be described later with reference to FIGS. 8 and 9.

The back-end interface 240 connects the data management system 100 and the storage system 102 to each other. The storage drive 250 is a storage device such as an HDD or an SSD.

The functions of the data management system 100 (the compressor/decompressor for AI 110, the compressor/decompressor for visual 120, the compression control unit 130, and the like) may be realized by, for example, the processor 220 reading a program stored in the storage drive 250 into the RAM 230 and executing the program (software), may be realized by hardware such as a dedicated circuit, or may be realized by a combination of software and hardware. Note that one function of the data management system 100 may be divided into a plurality of functions, or the plurality of functions may be combined into one function. Some of the functions of the data management system 100 may be provided as separate functions or may be included in another function. Some of the functions of the data management system 100 may be realized by other computers that can communicate with the data management system 100.

Note that the data management system 100 may have a configuration in which individual integrated circuits (IC) equipped with the above-described components are connected to each other, or may have a configuration in which some of the components are implemented by one semiconductor element as an application specific integrated circuit (ASIC), an FPGA, or the like. The data management system 100 may be a virtual machine (VM).

The collection unit 101 is a computer including hardware resources such as a processor, a memory, and a network interface, and software resources such as a driver of the data generation source 105. The collection unit 101 converts data (signal) output by the data generation source 105 into a file format that the data management system 100 and the storage system 102 can accept, such as portable network graphics (PNG), MPEG 1 audio layer-3 (MP3), comma-separated values (csv), or binary, and requests the storage system 102 to write the converted data through the switch 201.

Note that the collection unit 101 may be a device different from the data generation source 105, or may be implemented as a function of the data generation source 105. The number of collection units 101 is not limited to one, and may be two or more. The data management system 100 and the collection unit 101 may be different devices or may be the same device (one device).

The storage system 102 is a storage device that includes a front-end interface, a processor, a RAM, a switch, and a storage drive. Note that the data management system 100 and the storage system 102 may be different devices or may be the same device (one device).

The AI processing unit 103 is a computer including hardware resources such as a processor, a memory, and a network interface, and software resources such as an application including the image utilization AI 106. Note that the data management system 100 and the AI processing unit 103 may be different devices or may be the same device (one device).

The operation unit 104 is a computer including hardware resources such as a processor, a memory, a network interface, an input device, and an output device, and software resources such as an application including a browser. The input device is a user interface that receives information from a user. The input device is, for example, a keyboard, a mouse, a card reader, a touch panel, or the like. The output device is a user interface that outputs various types of information (display output, audio output, print output, and the like). The output device is, for example, a display device that visualizes various types of information, an audio output device (speaker), a printer, or the like. The display device is a liquid crystal display (LCD), a graphic card, or the like. Note that the data management system 100 and the operation unit 104 may be different devices or the same device (one device).

FIG. 3 is a diagram illustrating a learning method for the compressor/decompressor for AI 110. The learning of the compressor/decompressor for AI 110 is performed by a learning device 300 that includes a processor, a memory, a network interface, and the like. The learning device 300 may be included in the data management system 100 or may be a computer different from the data management system 100.

The learning device 300 includes a compressor 310, a decompressor 320, and an evaluation unit 330. The compressor 310 includes a network 311 and a weight parameter 312. For example, the weight parameter 312 is a parameter constituted by a weight for controlling the importance of an input signal in a perceptron of the network 311, and a bias for adjusting the ease of firing (the degree to which an output signal outputs "1").

The decompressor 320 includes a network 321 and a weight parameter 322. The weight parameter 322 is the same as the weight parameter 312 and is, for example, a parameter constituted by a weight and a bias in a perceptron of the network 321.

As illustrated in FIG. 3, the learning device 300 inputs an original image 301 to the compressor 310 and the evaluation unit 330. The original image 301 may be an image generated by the data generation source 105, may be an image which is a portion extracted from the image generated by the data generation source 105 (a part including an object used for learning and inference performed by the image utilization AI 106), may be an image which is separately prepared by a system administrator or the like, or any of other images.

The compressor 310 compresses the original image 301 and transmits the compressed image to the decompressor 320. Here, the learning device 300 calculates a compression ratio 303 from the original image 301 and the image compressed by the compressor 310 and transmits the calculated compression ratio 303 to the evaluation unit 330. The learning device 300 calculates a processing time 304 required for compressing the original image 301 and transmits the calculated processing time 304 to the evaluation unit 330.

Note that, hereinafter, a compression ratio of data will be described as a ratio representing how much information amount of compressed data is reduced from the original data when the data is compressed. For example, when data of 10 MB is compressed to 1 MB, a compression ratio is "0.1 (=1/10)". The compression ratio may be expressed as a percentage obtained by multiplying a ratio by 100, or as a ratio of the reduced amount of information to the original amount of information. For example, a state where the amount of information has been compressed to a relatively small amount (compressed well) may be expressed as a "high compression ratio", and a state where the amount of information has been compressed to a relatively large amount (less compressed) may be expressed as a "low compression ratio".

The decompressor 320 decompresses an image compressed by the compressor 310 and transmits the decompressed image (compressed/decompressed image 302) to the evaluation unit 330. Here, the learning device 300 calculates the processing time 304 required for decompressing the image compressed by the compressor 310 and transmits the calculated processing time 304 to the evaluation unit 330.

The evaluation unit 330 includes a score calculation unit 331, and the score calculation unit 331 calculates a score using the following (Equation 1).

$$Score = a \times Q + b \times C + c \times T \qquad \text{(Equation 1)}$$

a, b, c: Weighting constant

Q: Image quality evaluation result (>0, small: high image quality)

C: Compression ratio evaluation result (>0, small: high compression ratio)

T: Processing time evaluation result (>0, small: short time)

An image quality evaluation result is a result calculated (evaluated) by an image quality evaluation unit 410 or an image quality evaluation unit 510, which will be described later. A compression ratio evaluation result is a result calculated by a compression ratio evaluation unit 420, which will be described later. A processing time evaluation result is a result calculated by a processing time evaluation unit 430, which will be described later.

The learning device 300 learns the compressor 310 and the decompressor 320 by searching for the weight parameter 312 and the weight parameter 322 for minimizing the score calculated by the score calculation unit 331, and generates the compressor 111 and the decompressor 112 (compressor/decompressor for AI 110).

Here, a learning method for the compressor/decompressor for visual 120 is the same as the learning method for the compressor/decompressor for AI 110, and thus is not illustrated in the drawing. In the training of the compressor/decompressor for visual 120, an evaluation method for the compressor/decompressor for visual 120 is different, and an evaluation unit 600, which will be described later, is used instead of the evaluation unit 330.

FIG. 4 is a diagram illustrating an example of a configuration related to the evaluation unit 330 used for learning of the compressor/decompressor for AI 110.

The evaluation unit 330 includes an image quality evaluation unit 410, a compression ratio evaluation unit 420, and a processing time evaluation unit 430 in addition to the score calculation unit 331.

The image quality evaluation unit 410 includes an external cooperation unit 411, and a correct answer rate calculation unit 412. The external cooperation unit 411 transmits a pair of the original image 301 and the compressed/decompressed image 302 to the image utilization AI 106. The image utilization AI 106 performs inference using each of the original image 301 and the compressed/decompressed image 302 and transmits an inference result to the external cooperation unit 411. The external cooperation unit 411 transmits an inference result 401 of the original image 301 and an inference result 402 of the compressed/decompressed image 302 to the correct answer rate calculation unit 412.

The correct answer rate calculation unit 412 calculates a correct answer rate based on the inference result 401 of the original image 301 and the inference result 402 of the compressed/decompressed image 302. For example, when there are 100 original images 301 and 100 compressed/decompressed images 302 obtained by compressing and decompressing the original image 301, the correct answer rate calculation unit 412 calculates a correct answer rate of 90% when 90 images match and 10 images do not match in the inference result 401 of the original image 301 and the inference result 402 of the compressed/decompressed image 302. The correct answer rate calculation unit 412 transmits a value obtained by normalizing the correct answer rate to the score calculation unit 331 as an image quality evaluation result so that the value decreases as the correct answer rate increases.

The compression ratio evaluation unit 420 calculates a divergence value between a predetermined reference compression ratio and the compression ratio 303. For example, when the reference compression ratio is Cs, and the compression ratio 303 is Ci, "Ci–Cs" is calculated as a divergence value. The compression ratio evaluation unit 420 transmits a value obtained by normalizing the divergence value to the score calculation unit 331 as a compression ratio evaluation result so that the value decreases as the divergence value decreases (the compression ratio increases).

The processing time evaluation unit 430 calculates a divergence value between a predetermined reference processing time and the processing time 304 (for example, the sum of a processing time required for compression performed by the compressor 310 and a processing time required for decompression performed by the decompressor 320). For example, when the reference processing time is Ts, and the processing time 304 is Ti, "Ti–Ts" is calculated as a divergence value. The processing time evaluation unit 430 transmits a value obtained by normalizing the divergence value to the score calculation unit 331 as a processing time evaluation result so that the value decreases as the divergence value decreases (the processing time 304 decreases).

The score calculation unit 331 substitutes an image quality evaluation result calculated by the image quality evaluation unit 410, a compression ratio evaluation result calculated by the compression ratio evaluation unit 420, and a processing time evaluation result calculated by the processing time evaluation unit 430 into the above-described (Equation 1) to calculate a score.

Here, a weighting constant in the learning of the compressor/decompressor for AI 110 is set such that the image quality evaluation result (compressed/decompressed image 302) satisfies an image quality that can withstand the learning and inference in the image utilization AI 106, and the processing time evaluation result (processing time 304) is emphasized. Note that, regarding the image quality that can withstand the learning and inference in the image utilization AI 106, the acquisition of a predetermined accuracy (for example, a correct answer rate of 90% or more) of the correct answer rate calculated by the correct answer rate calculation unit 412 is set to be an image quality evaluation index.

According to the evaluation unit 330, it is possible to create the compressor/decompressor for AI 110 that emphasizes a processing time while satisfying image quality that can withstand learning and inference in the image utilization AI 106.

FIG. 5 is a diagram illustrating an example of a configuration of the evaluation unit 330 used for learning of the compressor/decompressor for AI 110. Note that the learning device 300 may learn the compressor/decompressor for AI 110 using any one of the evaluation units 330 illustrated in FIGS. 4 and 5.

As illustrated in FIG. 5, teacher data 501 is attached to the original image 301. The teacher data 501 is, for example, a label (correct answer label) indicating an image when a non-defective product is received, or a label (incorrect answer label) indicating an image when a defective product is received.

The evaluation unit 330 includes a score calculation unit 331, a compression ratio evaluation unit 420, a processing time evaluation unit 430, and an image quality evaluation unit 510.

The image quality evaluation unit 510 includes an external cooperation unit 511 and a correct answer rate calculation unit 512. The external cooperation unit 511 transmits the compressed/decompressed image 302 to the image utilization AI 106. The image utilization AI 106 performs inference using the compressed/decompressed image 302 and transmits an inference result 502 to the external cooperation unit 511. The external cooperation unit 511 transmits the inference result 502 of the compressed/decompressed image 302 to the correct answer rate calculation unit 512.

The correct answer rate calculation unit 512 calculates a correct answer rate based on the teacher data 501 and the inference result 502 of the compressed/decompressed image 302. For example, when there are 100 original images 301 and 100 compressed/decompressed images 302 obtained by compressing and decompressing the original images 301, the correct answer rate calculation unit 512 calculates a correct answer rate of 90% when 90 images match and 10 images do not match in the teacher data 501 of the original images 301 and the inference result 502 of the compressed/decompressed images 302. The correct answer rate calculation unit 512 transmits a value obtained by normalizing the correct answer rate to the score calculation unit 331 as an image quality evaluation result so that the value decreases as the correct answer rate increases.

According to the configuration in FIG. 5, a correct answer rate can be calculated more accurately than in the configuration in FIG. 4.

FIG. 6 is a diagram illustrating an example of a configuration related to the evaluation unit 600 used for learning of the compressor/decompressor for visual 120.

The evaluation unit 600 includes the score calculation unit 331, the compression ratio evaluation unit 420, the processing time evaluation unit 430, and an image quality evaluation unit 610.

The image quality evaluation unit 610 includes a comparison display unit 611 and an error rate calculation unit 612. The comparison display unit 611 generates a screen (image comparison selection interface) that allows a user to compare and select the original image 301 and the compressed/decompressed image 302, and transmits the generated screen to a predetermined computer communicatively connected to the learning device 300. Hereinafter, description will be given by taking the operation unit 104 as an example of the predetermined computer. The screen includes the original image 301, the compressed/decompressed image 302 obtained by compressing and decompressing the original image 301, and a question such as "Which image looks like the original image?". The operation unit 104 accepts selection of an image considered to be the original image 301 from the user, and transmits selection results to the error rate calculation unit 612. Note that the original image 301 used for learning of the compressor/decompressor for visual 120 and the original image 301 used for learning of the compressor/decompressor for AI 110 may be the same or different.

The error rate calculation unit 612 calculates an error rate based on the selection results. When there are 100 pairs of the original image 301 and the compressed/decompressed image 302, and 30 pairs of the selection results are incorrect, the error rate calculation unit 612 calculates an error rate of 30%. Then, the error rate calculation unit 612 transmits a value obtained by normalizing the error rate to the score calculation unit 331 as an image quality evaluation result so that the value decreases as the error rate becomes closer to 50%.

The score calculation unit 331 substitutes an image quality evaluation result calculated by the image quality evaluation unit 610, a compression ratio evaluation result calculated by the compression ratio evaluation unit 420, and a processing time evaluation result calculated by the processing time evaluation unit 430 into the above-described Equation 1 to calculate a score.

Here, a weighting constant in the learning of the compressor/decompressor for visual 120 is set such that image quality evaluation result (compression/decompression image 302) satisfies an image quality that can withstand verification performed by the user, and the compression ratio evaluation result (compression ratio 303) is emphasized. Note that, regarding the image quality that can withstand verification performed by the user, the acquisition of a predetermined accuracy (for example, an error rate of 45%) indicating that it is difficult to distinguish between a genuine one and a false one is set to be an image quality evaluation index.

According to the evaluation unit 600, instead of reducing the image quality of the compressed/decompressed image 302 to an image quality that can withstand human visual observation, the compressor/decompressor for visual 120 that emphasizes a compression ratio can be created.

FIG. 7 is a diagram illustrating an example of a configuration related to the evaluation unit 600 used for learning of the compressor/decompressor for visual 120. FIG. 7 is different from FIG. 6 in that the user has determined which is genuine in FIG. 6, but AI (genuine determination AI 700) determines which is genuine in FIG. 7. The genuine determination AI 700 is a generative adversarial network (GAN) discriminator or the like. The genuine determination AI 700 is provided in a predetermined computer. Note that the learning device 300 may learn the compressor/decompressor for visual 120 using any one of the evaluation units 600 illustrated in FIGS. 6 and 7.

The comparison display unit 611 transmits a pair of the original image 301 (genuine one) and the compressed/decompressed image 302 (false one) to the genuine determination AI 700. The genuine determination AI 700 transmits an image estimated to be the original image 301 to the error rate calculation unit 612 as an estimation result.

The error rate calculation unit 612 calculates an error rate based on the estimation result. When there are 100 pairs of the original image 301 and the compressed/decompressed image 302, and 30 pairs of the estimation results are incorrect, the error rate calculation unit 612 calculates an error rate of 30%. Then, the error rate calculation unit 612 transmits a value obtained by normalizing the error rate to the score calculation unit 331 as an image quality evaluation result so that the value decreases as the error rate becomes closer to 50%.

FIG. 8 is a diagram illustrating an example of the management information 280 (management table 800).

The management table 800 stores information for managing compressed images (a first compressed image and a second compressed image). More specifically, the management table 800 stores pieces of information of an ID 801, a status 802, a generation date 803, a last reference date 804, and a storage location 805 in association with each other.

The ID 801 is information for identifying a compressed image. The status 802 is information indicating the status of the compressed image identified by the ID 801. The status 802 is set to "compression for AI" when the compressed image is the first compressed image, and is set to "compression for visual" when the compressed image is the second compressed image. The generation date 803 is information indicating the date (may be date and time, or the like) when the compressed image is generated. The last reference date 804 is information indicating the last date (may be date and time, or the like) when the compressed image is referred to. The storage location 805 is information indicating the location where the compressed image is stored.

FIG. 9 is a diagram illustrating an example of the management information 280 (management table 900).

The management table 900 stores information related to recompression of the first compressed image and information related to deletion of the second compressed image. More specifically, the management table 900 stores pieces of information of an item 901 and a value 902 of the item 901 in association with each other.

FIG. 10 is a diagram illustrating an example of compressed image management processing performed by the compression control unit 130. The compressed image management processing is performed for all entries in the management table 800 (performed for each compressed image). The compressed image management processing is performed at a predetermined timing. The predetermined timing may be a time designated in advance, may be periodic (every day, every week, every month, or the like), or may be a timing indicated by a system administrator, a user, or the like or may be any of other timings.

In step S1000, the compression control unit 130 selects one entry from among unprocessed entries in the management table 800 (selects a target entry). Note that, when there is no unprocessed entry, the compression control unit 130 terminates the compressed image management processing.

In step S1001, the compression control unit 130 confirms the status 802 of the target entry. When the status 802 is "compression for AI" (when the compressed image of the target entry is the first compressed image), the compression control unit 130 progresses the processing to step S1002, and when the status 802 is "compression for visual" (when the compressed image of the target entry is the second compressed image), the compression control unit 130 progresses the processing to step S1005.

In step S1002, the compression control unit 130 determines whether there is a possibility that the compressed image of the target entry will be used for learning and inference of the image utilization AI 106 (whether there is a possibility of use). Here, the compression control unit 130 acquires, for example, the value 902 "100,000 sheets" of the item 901 "number of used sheets" from the management table 900. The compression control unit 130 determines whether there are 100,000 or more compressed images in each of which the status 802 of the entry is "compression for AI" and the generation date 803 is newer than that of the target entry.

When the compression control unit 130 determines that there is a possibility of use (the number of new compressed images is less than 100,000), the processing proceeds to step S1000, and when the compression control unit 130 determines that there is no possibility of use (the number of new compressed images is 100,000 or more), the processing proceeds to step S1003.

In step S1003, the compression control unit 130 transmits a compression instruction to the compressor/decompressor for visual 120 to recompress the compressed image of the target entry. For example, the compressor/decompressor for visual 120 decompresses the compressed image (first compressed image) of the target entry using the compressor/decompressor for AI 110, compresses the decompressed image (first decompressed image), and stores the compressed image (second compressed image) in the storage system 102 instead of the compressed image of the target entry.

In step S1004, the compression control unit 130 updates management table 800. For example, the compression control unit 130 updates the status 802 of the target entry to "compression for visual" and updates the generation date 803 of the target entry to the current date.

In step S1005, the compression control unit 130 determines whether a storage period has elapsed. Here, the compression control unit 130 acquires, for example, a value 902 of "10 years" of an item 901 of "storage period" from the management table 900. The compression control unit 130 determines whether a period from the generation date 803 of the target entry to the present time exceeds "10 years". When the compression control unit 130 determines that the storage period has elapsed, the processing proceeds to step S1006, and when the compression control unit 130 determines that the storage period has not elapsed, the processing proceeds to step S1000.

In step S1006, the compression control unit 130 determines whether a specified period has elapsed. Here, the compression control unit 130 acquires, for example, a value 902 of "two months" of an item 901 of "specified period" from the management table 900. The compression control unit 130 determines whether a period from the last reference date 804 of the target entry to the present time exceeds "two months". When the compression control unit 130 determines that the specified period has elapsed, the processing proceeds to step S1007, and when the compression control unit 130 determines that the specified period has not elapsed, the processing proceeds to step S1000.

In step S1007, the compression control unit 130 discards the compressed image (second compressed image) of the target entry. That is, the compression control unit 130 discards a second compressed image that has elapsed 10 years from the generation date of the second compressed image and 2 months from the last reference date of the second compressed image.

In step S1008, the compression control unit 130 updates the management table 800. For example, the compression control unit 130 updates the status 802 of the target entry to "discard". Note that the compression control unit 130 may delete the target entry in the management table 800.

According to the present embodiment, the amount of data required for storage can be reduced without interfering with the application of the data.

(II) Appendices

The above-described embodiment includes, for example, the following contents.

In the above-described embodiment, a case where the invention is applied to a data management system has been described, but the invention is not limited thereto and can be widely applied to various other systems, devices, methods, and programs.

In the above-described embodiment, a case where the learning device 300 calculates the processing time 304 and evaluates a period of time required for compression and decompression of the compressed/decompressed image 302 has been described, but the invention is not limited thereto. The learning device 300 may calculate a processing speed from the processing time 304 and evaluate a period of time required for compression and decompression of the compressed/decompressed image 302.

In the above-described embodiment, a case where the storage system 102 stores all pieces of data obtained by compressing data, which is generated by the data generation source 105, by the compressor/decompressor for AI 110 has been described, but the invention is not limited thereto. The storage system 102 may store a portion (data from which a part including an object used for learning and inference performed by the image utilization AI 106 is extracted) of the data obtained by compressing data, which is generated by the data generation source 105, by the compressor/decompressor for AI 110.

In the above-described embodiment, some or all of the programs may be installed on a device such as a computer from a program source. The program source may be, for example, a program distribution server connected by a network or a computer-readable recording medium (for example, a non-transitory recording medium). In the above description, two or more programs may be implemented as one program, or one program may be implemented as two or more programs.

In the above-described embodiment, the configurations of the tables are examples, and one table may be divided into two or more tables, or all or some of the two or more tables may be one table.

In the above description, information such as programs, tables, files, and the like that realize the functions can be stored in a storage device such as a memory, a hard disk, or a solid state drive (SSD), or a recording medium such as an IC card, an SD card, or a DVD.

The above-described embodiment has, for example, the following characteristic configurations.

(1) A data management system (for example, the data management system 100) includes a processor (for example, the processor 220) connected to a storage device (for example, a storage device communicatively coupled to the storage system 102, the storage drive 250, and the data management system 100) that stores data (for example, the first compressed image, the audio data, the log data, all or a portion of data obtained by compressing data, which is generated by the data generation source 105, by the compressor/decompressor for AI 110, all or a portion of uncompressed data generated by the data generation source 105, and the like) usable for learning and inference in a machine learning model (for example, the image utilization AI 106). The data management system includes a compressor/decompressor for human (for example, the compressor/decompressor for visual 120) that compresses and decompresses data to be usable for verification performed by human. The processor specifies data that is no longer used for learning and inference in the machine learning model among the data stored in the storage device (see, for example, step S1002) and compresses the specified data using the compressor/decompressor for human (see, for example, step S1003).

In the above configuration, the data that is no longer used for learning and inference in the machine learning model is compressed to be usable for verification performed by human, and thus it is possible to reduce storage capacity required for storage of data for verification. According to the above configuration, the amount of data can be reduced according to the application of the data.

(2) The data management system includes a compressor/decompressor for model (for example, the compressor/decompressor for AI 110) that compresses and decompresses data to be usable for learning and inference in the machine learning model. The data stored in the storage device and used for learning and inference in the machine learning model is data obtained by compressing data, which is acquired from a data generation source, using the compressor/decompressor for model by the processor and stored in the storage device (see, for example, FIG. 1).

In the above configuration, the data acquired from the data generation source is compressed, and thus it is possible to reduce the amount of data used for learning and inference in the machine learning model. For example, the storage capacity required for storage of the data can be reduced, and thus the amount of data can be further reduced according to the application of the data.

(3) The data generation source is a camera, a devices equipped with a camera, or the like. The data generated by the data generation source is an image. The compressor/decompressor for human is a neural network that has been learned with an emphasis on a compression ratio of an image rather than a period of time required for compression and decompression of an image while satisfying image quality that is able to withstand verification performed by human (see, for example, FIGS. 6 and 7).

According to the above configuration, for example, it is possible to obtain a high compression ratio while satisfying image quality that can withstand verification performed by human.

(4) The data generation source is a camera, a device equipped with a camera, or the like. The data generated by the data generation source is an image. The compressor/decompressor for model is a neural network that has been learned with an emphasis on a period of time required for compression and decompression of an image rather than a compression ratio of an image while satisfying image quality that is able to withstand learning and inference in the machine learning model (see, for example, FIGS. 4 and 5).

According to the above configuration, for example, it is possible to reduce the amount of data while reducing the influence of using an image in the machine learning model.

(5) The compressor/decompressor for human has learned using a difficulty of distinguishing between a genuine one and a false one as an image quality evaluation index (see, for example, FIGS. 6 and 7).

According to the above configuration, for example, the image quality can be improved according to human visual applications.

(6) The compressor/decompressor for model has learned using the accuracy of the machine learning model as an image quality evaluation index (see, for example, FIGS. 6 and 7).

According to the above configuration, for example, the image quality can be improved according to an application in the inference in the machine learning model.

The above-described configurations may be appropriately changed, rearranged, combined, or omitted within the scope of the invention.

It should be understood that items included in a list in a form "at least one of A, B, and C" can mean (A), (B), (C), (A and B), (A and C), (B and C), or (A, B, and C). Similarly, items listed in a form "at least one of A, B, or C" can mean (A), (B), (C), (A and B), (A and C), (B and C), or (A, B, and C).

REFERENCE SIGNS LIST

100: data management system
110: compressor/decompressor for AI
120: compressor/decompressor for visual

The invention claimed is:

1. A data management system for reducing storage resources while maintaining usability of stored data for (i) machine-learning learning and inference during an active phase and (ii) subsequent verification by a human user during an archival phase, comprising:
    a storage device configured to store data usable for learning and inference in a machine-learning model;
    a processor connected to the storage device;
    a model-use compressor/decompressor configured to compress and decompress data into a representation usable for learning and inference by the machine-learning model; and
    a human verification compressor/decompressor configured to compress and decompress data into a representation presentable to at least one human user for verification;
    wherein the processor is configured to:
      (a) acquire data from a data generation source;
      (b) compress the acquired data using the model-use compressor/decompressor to generate first compressed data stored in the storage device for learning and inference by the machine-learning model;
      (c) identify, among the first compressed data stored in the storage device, specified data that is no longer used for learning and inference in the machine learning model;
      (d) generate second compressed data by recompressing the specified data using the human-verification compressor/decompressor; and
      (e) store the second compressed data in the storage device in association with the specified data,
    wherein the human-verification compressor/decompressor, when decompressing the second compressed data, outputs a human-verifiable reconstruction of the specified data that is usable by the human user to perform said verification, and
    wherein storing the second compressed data in place of, or in addition to, the first compressed data reduces an amount of storage required for retaining the specified data while maintaining usability of the specified data for said subsequent verification by the human user.

2. The data management system of claim 1, further comprising:
    wherein the first compressed data stored in the storage device is data obtained by compressing the data acquired from the data generation source using the model-use compressor/decompressor.

3. The data management system of claim 1, wherein the human-verification compressor/decompressor comprises a neural network trained using a loss function that emphasizes compression ratio while satisfying a human-verification constraint that the human-verifiable reconstruction remains suitable for verification by the human user.

4. The data management system of claim 3, wherein:
    (a) the data generated by the data generation source includes an image;
    (b) the human-verification constraint is defined by an image-quality evaluation index based on a difficulty, by the human user, of distinguishing (i) an original image from (ii) a reconstructed image obtained by decompressing the second compressed data; and
    (c) the image-quality evaluation index is used in training the neural network of the human-verification compressor/decompressor.

5. The data management system of claim 1, wherein the processor identifies the specified data as no longer used for learning and inference based on at least one retention condition comprising (i) elapsed time since acquisition, (ii) a quantity of newly acquired data exceeding a threshold, (iii) completion of a training update of the machine-learning model, or (iv) expiration of a training dataset window used for the learning.

6. The data management system of claim 1, wherein generating the second compressed data comprises decompressing the first compressed data using the model-use compressor/decompressor to obtain an intermediate reconstruction and compressing the intermediate reconstruction using the human-verification compressor/decompressor.

7. The data management system of claim 1, wherein the processor, upon storing the second compressed data, deletes or deprecates storage of the first compressed data corresponding to the specified data to reduce the amount of storage required for retaining the specified data.

8. The data management system of claim 1, wherein the storage device comprises a first storage tier for the first compressed data and a second storage tier for the second compressed data, and wherein the second storage tier has lower cost per unit storage than the first storage tier.

9. The data management system of claim 1, wherein the processor stores, in association with the second compressed data, provenance metadata identifying at least one of: (i) a time at which recompression occurred, (ii) a version identifier of the human-verification compressor/decompressor, (iii) a version identifier of the machine-learning model, or (iv) the retention condition that caused the recompression.

10. The data management system of claim 1, wherein the processor stores, in association with the specified data, a pointer or mapping from the first compressed data to the second compressed data, and wherein the pointer or mapping enables retrieval of the second compressed data in response to a request to access the specified data.

11. The data management system of claim 1, wherein access to decompress the second compressed data using the human-verification compressor/decompressor is restricted by an access control policy such that only authorized users can obtain the human-verifiable reconstruction.

12. The data management system of claim 1, wherein the processor computes and stores, in association with the second compressed data, an integrity value comprising a checksum or cryptographic hash, and verifies the integrity value prior to decompressing the second compressed data.

13. The data management system of claim 1, wherein the processor determines a target compression ratio for the human-verification compressor/decompressor based on at least one of: (i) an expected archival retention duration, (ii) an access frequency estimate for verification, or (iii) a storage budget, and generates the second compressed data using the target compression ratio.

14. The data management system of claim 1, wherein the human-verification compressor/decompressor is configured to produce the human-verifiable reconstruction at a resolution or quality level selectable by the human user, and wherein the selection affects decompression parameters without changing the second compressed data.

15. The data management system of claim 1, wherein the processor maintains an audit log recording at least one of: (i) identification of the specified data, (ii) generation of the second compressed data, (iii) deletion or deprecation of the first compressed data, or (iv) access to the human-verifiable reconstruction by the human user.

16. The data management system of claim 1, wherein the processor performs the recompressing of the specified data to generate the second compressed data as a background task scheduled based on available compute resources or I/O bandwidth.

17. The data management system of claim 1, wherein the processor selectively refrains from recompressing a data item that would otherwise be identified as no longer used for learning and inference when the data item is associated with a hold flag indicating litigation hold, regulatory retention, or ongoing investigation.

18. The data management system of claim 1, wherein the model-use compressor/decompressor comprises a neural network trained using a loss function that emphasizes a period of time required for compression and decompression while satisfying a model-performance constraint for learning and inference by the machine-learning model.

19. The data management system of claim 18, wherein an image-quality evaluation index used in training the neural network of the model-use compressor/decompressor comprises an accuracy of the machine-learning model measured when performing inference using images produced by decompressing the first compressed data.

20. A data management method for reducing storage resources while maintaining usability of retained data for subsequent verification by a human user after completion of a machine-learning learning and inference phase, in a data management system including a processor connected to a storage device that stores data usable for learning and inference in a machine-learning model, the data management system including a model-use compressor/decompressor and a human verification compressor/decompressor, the method comprising:

(a) acquiring data from a data generation source;

(b) compressing the acquired data using the model-use compressor/decompressor to specify data generate first compressed data stored in the storage device for learning and inference by the machine-learning model;

(c) specifying data, among the first compressed data stored in the storage device, that is no longer used for learning and inference in the machine-learning model; and (d) generating second compressed data by recompressing the specified data using the human-verification compressor/decompressor, such that decompression of the second compressed data produces a human-verifiable reconstruction usable by a human user to perform verification, wherein storing the second compressed data reduces an amount of storage required for retaining the specified data for said subsequent verification.

* * * * *